United States Patent
Deen et al.

(10) Patent No.: US 9,934,798 B1
(45) Date of Patent: Apr. 3, 2018

(54) LATERAL SPIN VALVE READER WITH VERTICALLY-INTEGRATED TWO-DIMENSIONAL SEMICONDUCTING CHANNEL

(71) Applicant: Seagate Technology LLC, Cupertino, CA (US)

(72) Inventors: David A. Deen, Edina, MN (US); Thomas Roy Boonstra, Chaska, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/278,996

(22) Filed: Sep. 28, 2016

(51) Int. Cl.
G11B 5/39 (2006.01)
G11B 5/60 (2006.01)

(52) U.S. Cl.
CPC .......... G11B 5/3912 (2013.01); G11B 5/3909 (2013.01); G11B 5/3929 (2013.01); G11B 5/3958 (2013.01); G11B 5/6082 (2013.01)

(58) Field of Classification Search
CPC ... G11B 5/3909; G11B 5/3912; G11B 5/3929; G11B 5/3958
USPC ............... 360/316, 319, 324, 324.2
See application file for complete search history.

(56) References Cited

U.S. PATENT DOCUMENTS

| | | | |
|---|---|---|---|
| 7,020,013 B2 | 3/2006 | Johnson | |
| 7,193,891 B2 | 3/2007 | Johnson | |
| 8,072,713 B2 | 12/2011 | Yamada et al. | |
| 8,465,661 B2 | 6/2013 | Asano | |
| 8,614,435 B2 | 12/2013 | Avouris et al. | |
| 8,619,393 B2 | 12/2013 | Stokes | |
| 8,624,223 B2 | 1/2014 | Chen et al. | |
| 8,717,715 B1 | 5/2014 | Sato et al. | |
| 8,929,034 B2 | 1/2015 | Stokes | |
| 8,987,722 B2 | 3/2015 | Farmer | |
| 8,988,832 B2 | 3/2015 | McNeill et al. | |
| 9,019,664 B2 | 4/2015 | Song et al. | |
| 9,042,061 B2 | 5/2015 | Dimitrov et al. | |
| 9,064,509 B2 | 6/2015 | Dimitrov et al. | |
| 9,123,361 B1 * | 9/2015 | Kief | G11B 5/265 |
| 9,245,752 B2 | 1/2016 | Yeom et al. | |
| 9,257,510 B2 | 2/2016 | Yun et al. | |
| 9,478,240 B1 * | 10/2016 | Deen | G11B 5/3951 |
| 9,537,089 B2 * | 1/2017 | Hsueh | H01L 43/10 |
| 9,553,256 B2 * | 1/2017 | Hirohata | H01L 29/66984 |
| 2007/0253121 A1 | 11/2007 | Yamada et al. | |
| 2009/0154030 A1 | 6/2009 | Yamada et al. | |
| 2010/0119875 A1 | 5/2010 | Sasaki | |

(Continued)

OTHER PUBLICATIONS

Feng, Tian et al., "Carrier statistics and quantum capacitance of graphene sheets and ribbons", Applied Physics Letters 91, 092109, Aug. 27, 2007, 3 pages.

(Continued)

*Primary Examiner* — Jefferson Evans
(74) *Attorney, Agent, or Firm* — Westman, Champlin & Koehler, P.A.

(57) ABSTRACT

A lateral spin valve reader includes a detector located proximate to a bearing surface of the reader, and a spin injector located away from the bearing surface. The lateral spin valve reader also includes a channel that extends from the detector to the spin injector. The channel includes a two-dimensional semiconducting layer that extends from the detector to the spin injector.

15 Claims, 15 Drawing Sheets

(56) References Cited

U.S. PATENT DOCUMENTS

| | | | |
|---|---|---|---|
| 2011/0042648 A1 | 2/2011 | Koo et al. | |
| 2012/0074510 A1* | 3/2012 | Sasaki | G01R 33/093 257/422 |
| 2013/0140606 A1* | 6/2013 | Koo | H01L 29/66984 257/195 |
| 2013/0170290 A1* | 7/2013 | Odagawa | H01L 29/66984 365/158 |
| 2015/0035524 A1* | 2/2015 | Sasaki | G01R 33/093 324/244 |
| 2015/0228859 A1 | 8/2015 | Morreale | |
| 2015/0303059 A1 | 10/2015 | Friedman et al. | |
| 2016/0093746 A1* | 3/2016 | Kelber | H01L 29/4908 257/29 |
| 2016/0154071 A1* | 6/2016 | Sasaki | G01R 33/093 360/313 |
| 2016/0284982 A1* | 9/2016 | Sasaki | G01R 33/098 |
| 2017/0092302 A1* | 3/2017 | Deen | G11B 5/3903 |

OTHER PUBLICATIONS

Mayadas, A.F. et al., "Electrical-Resistivity Model for Polycrystalline Films : the Case of Arbitrary Reflection at External Surfaces", Physical Review B, vol. 1, No. 4, Feb. 15, 1970, 8 pages.

Tombros, Nikolaos et al., "Electronic spin transport and spin precession in single graphene layers at room temperature", vol. 448, Aug. 2, 2007, doi:10.1038/nature06037, 6 pages.

Tombros, Nikolaos et al., "Electronic spin transport and spin precession in single graphene layers at room temperature", 17 pages.

Cho, Sungjae et al., "Gate-tunable graphene spin valve", Applied Physics Letter 91, Sep. 19, 2007, 3 pages.

Yu, Qingkai et al., "Graphene segregated on Ni surfaces and transferred to insulators", Applied Physics Letters 93, 113103, Sep. 15, 2008, 4 pages.

Reina, Alfonso et al., "Large Area, Few-Layer Graphene Films on Arbitrary Substrates by Chemical Vapor Deposition", Nano Letters, vol. 9, No. 1, pp. 30-35, Dec. 1, 2008, 7 pages.

Li, Xuesong et al., "Large-Area Synthesis of High-Quality and Uniform Graphene Films on Copper Foils", Science, vol. 324, No. 1312, Jun. 5, 2009, 4 pages.

Meyer, J.C. et al., "The structure of suspended graphene sheets", vol. 446, Mar. 1, 2007, doi:10.1038/nature05545, 5 pages.

Meyer, J.C. et al., "The structure of suspended graphene sheets", 14 pages.

Ruan, Gedeng et al., "Growth of Graphene from Food, Insects, and Waste", www.acsnano.org, vol. 5, No. 9, pp. 7601-7607, Jul. 29, 2011, 7 pages.

Avsar, Ahmet et al., "Toward Wafer Scale Fabrication of Graphene Based Spin Valve Devices", Nano Letters, vol. 11, pp. 2363-2368, May 12, 2011, 6 pages.

\* cited by examiner

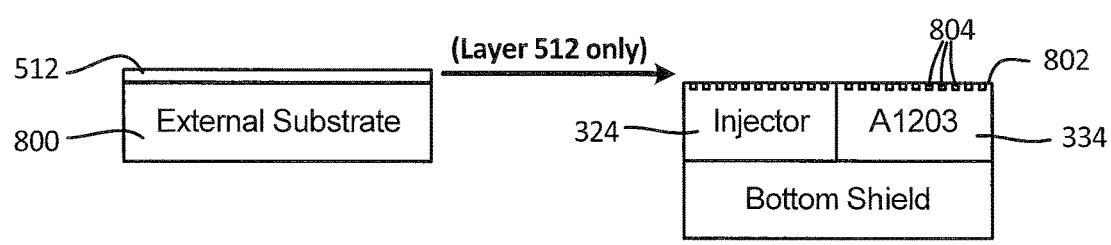
FIG. 8A
FIG. 8B
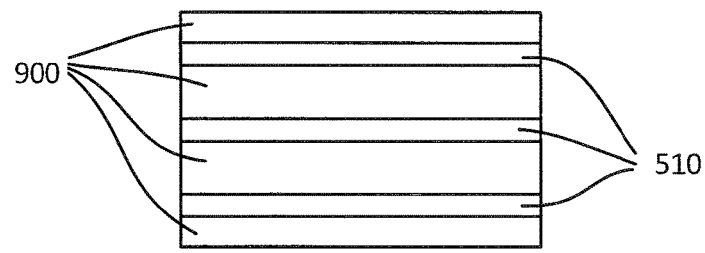
FIG. 9

LATERAL SPIN VALVE READER WITH VERTICALLY-INTEGRATED TWO-DIMENSIONAL SEMICONDUCTING CHANNEL

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor has traditionally been employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

The ever increasing need for increased data storage necessitates ever increasing data density in magnetic data storage devices. One way to increase data density is to decrease the size and spacing of magnetic bits recorded on the media. The read sensor is generally sandwiched between a pair of magnetic shields, the spacing between which determines the bit length, also referred to as gap thickness. Sensors such as GMR or TMR sensors are constructed as a stack of layers all formed upon one another sandwiched between the magnetic shields. Accordingly, the ability to reduce the spacing between shields with such a sensor structure is limited.

SUMMARY

The present disclosure relates to a lateral spin valve reader that addresses scaling challenges posed by greater data density requirements. The lateral spin valve reader includes a detector located proximate to a bearing surface of the reader, and a spin injector located away from the bearing surface. The lateral spin valve reader also includes a channel that extends from the detector to the spin injector. The channel includes a two-dimensional semiconducting layer that extends from the detector to the spin injector.

Other features and benefits that characterize embodiments of the disclosure will be apparent upon reading the following detailed description and review of the associated drawings.

BRIEF DESCRIPTION OF THE DRAWINGS

FIGS. 8A and 8B are schematic diagrams that illustrate steps in the formation of a portion of a lateral spin valve reader in accordance with another embodiment.

FIG. 9 is a schematic diagram that illustrates a step in the formation of a lateral spin valve reader in accordance with yet another embodiment.

DETAILED DESCRIPTION OF ILLUSTRATIVE EMBODIMENTS

Magnetic reader embodiments described below relate to lateral spin valve (LSV) readers that include a spin injector, a detector and a channel extending from the spin injector to the detector. The spin injector injects electron spins into the channel, which transports the spins to the detector. At the detector, the spins aid in detecting bits stored on a magnetic data storage medium. The LSV reader is sandwiched between a pair of magnetic shields. In different embodiments, the channel of the LSV reader includes a two-dimensional semiconducting layer to provide a drastic reduction in shield-to-shield spacing (SSS) in the reader. Prior to providing additional details regarding the different embodiments, a description of an illustrative operating environment is provided below.

Figure 1:
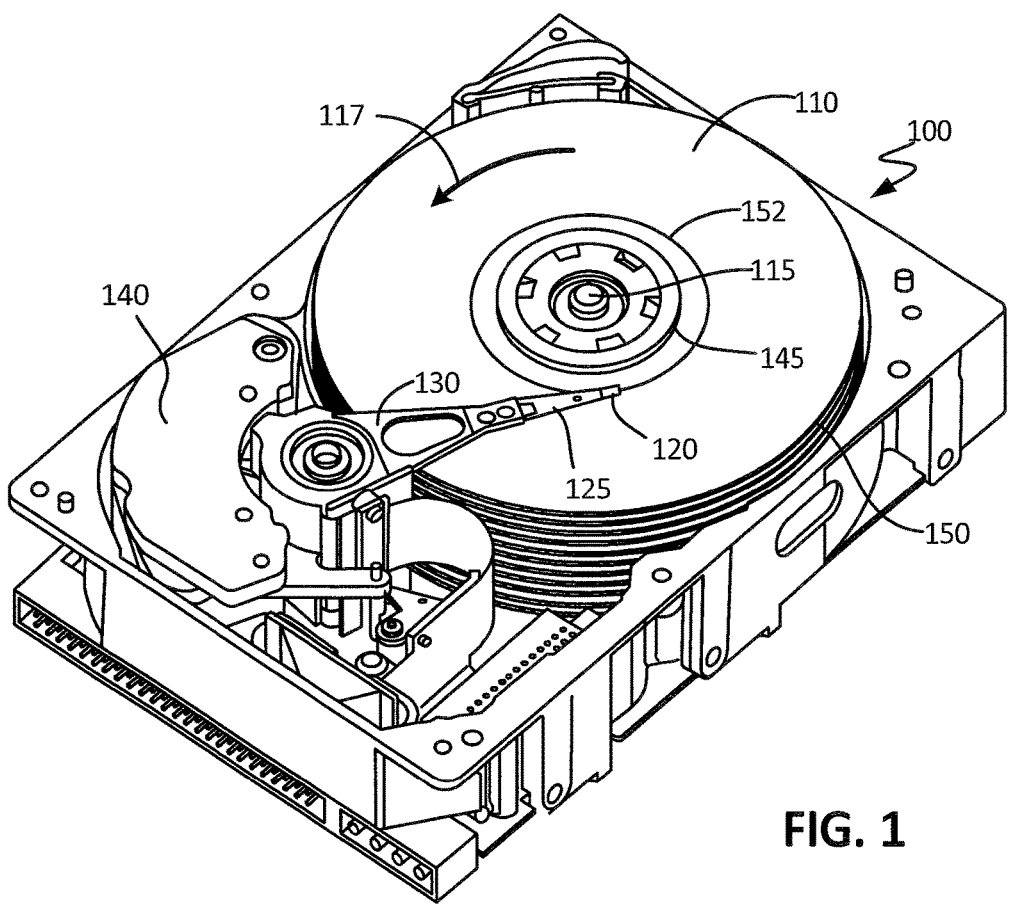
FIG. 1 is a perspective view of a data storage system.
Figure 2:
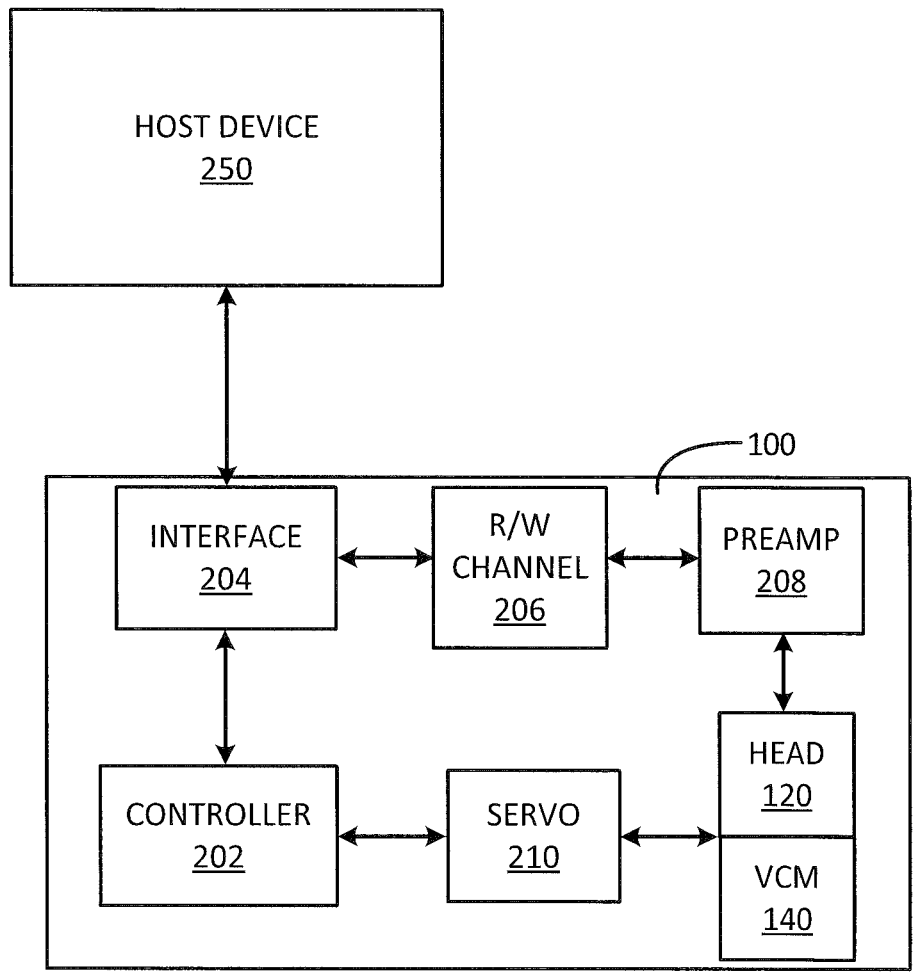
FIG. 2 is a generalized functional block diagram of a data storage system.

FIGS. 1 and 2 together show an illustrative operating environment in which certain specific embodiments disclosed herein may be incorporated. The operating environment shown in FIGS. 1 and 2 is for illustration purposes only. Embodiments of the present disclosure are not limited to any particular operating environment such as the operating environment shown in FIGS. 1 and 2. Embodiments of the present disclosure are illustratively practiced within any number of different types of operating environments.

FIG. 1 is a perspective view of a hard disc drive 100. Hard disc drives are a common type of data storage system. While embodiments of this disclosure are described in terms of disc drives, other types of data storage systems should be considered within the scope of the present disclosure. The same reference numerals are used in different figures for same or similar elements.

Disc drive 100 includes a data storage medium (for example, a magnetic disc) 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated recording head 120 that carries a read transducer and a write transducer for communication with the surface of the disc. Each head 120 is supported by a head gimbal assembly 125. Each head gimbal assembly (HGA) 125 illustratively includes a suspension and a HGA circuit. Each HGA circuit provides electrical pathways between a recording head and associated hard disc drive electrical components including preamplifiers, controllers, printed circuit boards, or other components. Each suspension mechanically supports an HGA circuit and a recording head 120, and transfers motion from actuator arm 130 to recording head 120. Each actuator arm 130 is rotated about a shaft by a voice coil motor assembly 140. As voice coil motor assembly 140 rotates actuator arm 130, head 120 moves in an arc between a disc inner diameter 145 and a disc outer diameter 150 and may be positioned over a desired track such as 152 to read and/or write data.

FIG. 2 is a generalized block diagram of illustrative control circuitry for the device shown in FIG. 1. The control circuitry includes a processor or controller 202 that directs or manages the high level operations of device 100. An interface circuit 204 facilitates communication between device 100 and a host device 250. A read/write channel 206 operates in conjunction with a preamplifier/driver circuit (preamp) 208 to write data to and to read data from a data storage medium such as medium 110 in FIG. 1. Preamp 208 also optionally acts as a power supply to electrical components included in a recording head such as a read transducer, a write transducer, heaters, etc. Preamp 208 is illustratively electrically connected to recording head 120 through a HGA circuit that is connected to preamp 208 and to one or more recording head 120 electrical connection points. A servo circuit 210 provides closed loop positional control for voice coil motor 140 that positions recording head 120.

Figure 3A:
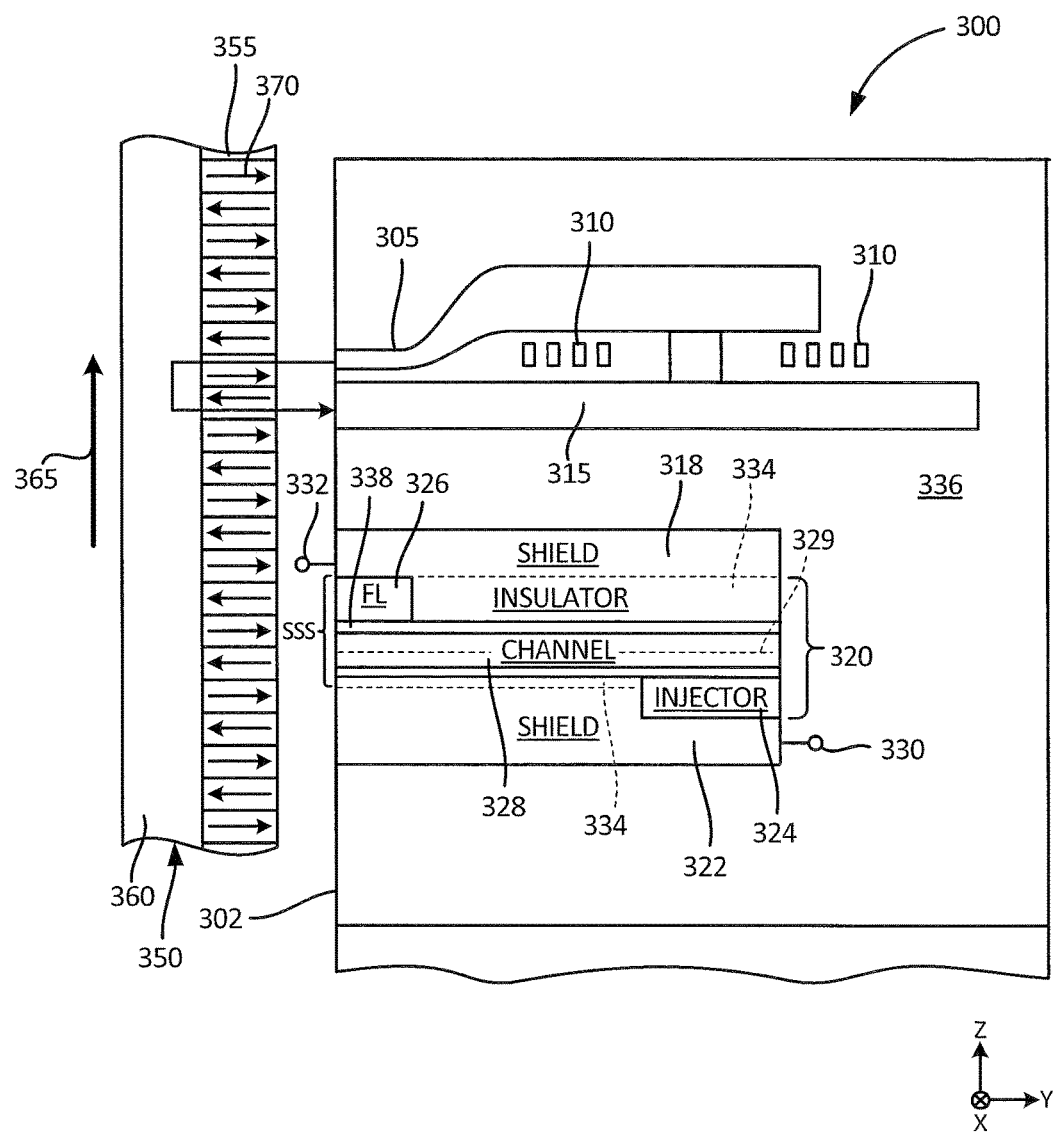
FIG. 3A is a schematic diagram of a cross-section of one embodiment of a recording head that reads from and writes to a storage medium.

FIG. 3A is a schematic diagram showing a cross-sectional view of portions of a recording head 300 and a data storage medium 350 taken along a plane substantially normal to a plane of a bearing surface (for example, an air bearing surface (ABS)) 302 of recording head 300. The recording head elements shown in FIG. 3A are illustratively included in a recording head such as recording head 120 in FIGS. 1 and 2. Medium 350 is illustratively a data storage medium such as medium 110 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 300 includes a write pole 305, a magnetization coil 310, a return pole 315, a top shield 318, a read transducer 320, a bottom shield 322 and a wafer overcoat 336. Storage medium 350 includes a recording layer 355 and an underlayer 360. Storage medium 350 rotates in the direction shown by arrow 365. Arrow 365 is illustratively a direction of rotation such as arrow 117 in FIG. 1.

In an embodiment, electric current is passed through coil 310 to generate a magnetic field. The magnetic field passes from write pole 305, through recording layer 355, into underlayer 360, and across to return pole 315. The magnetic field illustratively records a magnetization pattern 370 in recording layer 355. Read transducer 320 senses or detects magnetization patterns in recording layer 355, and is used in retrieving information previously recorded to layer 355.

In the embodiment shown in FIG. 3A, read transducer 320 is a LSV reader. LSV reader 320 includes a spin injector 324, a detector 326 and a channel 328 that extends from spin injector 324 to detector 326. An insulator 334 may be disposed around the channel 328. Insulation layer 334 between bottom shield 322 and channel 328 is substantially thinner than injector 324 in a region proximate to the bearing surface 302.

The spin injector 324 may include an electrically conductive, magnetic layer (not separately shown in FIG. 3A) that has a magnetization that is pinned in a direction (preferably perpendicular to the bearing surface). Pinning of the magnetization of the pinned magnetic layer may be achieved by, for example, exchange coupling with a layer of anti-ferromagnetic material (not separately shown in FIG. 3A).

The detector 326 may include a magnetic, electrically conductive layer having a magnetization that is free to move in response to a magnetic field, and can therefore be referred to herein as a free layer (FL). Detector 326 may be separated from channel 328 by a thin electrically insulating barrier layer 338.

The portion of LSV reader 320 proximate to the bearing surface 302 does not include relatively thick synthetic antiferromagnetic (SAF) and antiferromagnetic (AFM) stacks that are typically present in, for example, current perpendicular-to-plane (CPP) Tunnel Junction Magnetoresistive (TMR) readers. Therefore, a spacing between top shield 318 and bottom shield 322 of LSV reader 320, which is denoted by SSS (shield-to-shield spacing), is substantially less than a SSS in, for example, a CPP TMR reader. In embodiments of the disclosure, to further reduce SSS, a spacing reduction feature 329 is included in channel 328. Details of spacing reduction feature 329 are provided further below.

For allowing a detection current to flow to detector 326, spin injector 324 is connected to a current source (not shown) via terminal 330. Detector 326 is connected to a suitable voltage measuring device (not shown) via terminal 332.

First, the detection current from the current source is made to flow through the spin injector 324 and through the channel 328. This flow of current causes electron spins to accumulate in channel 328, which then transports the spins to the detector 326.

When the spins are transported to the detector 326, an electric potential difference, which varies depending upon an external magnetic field, appears between the detector 326 and the channel 328. The voltage measuring device detects electric potential difference appearing between the detector 326 and the channel 328. In this manner, the LSV reader 320 can be applied as an external magnetic field sensor for detecting bits stored on a magnetic data storage medium such as 350.

Figure 3B:
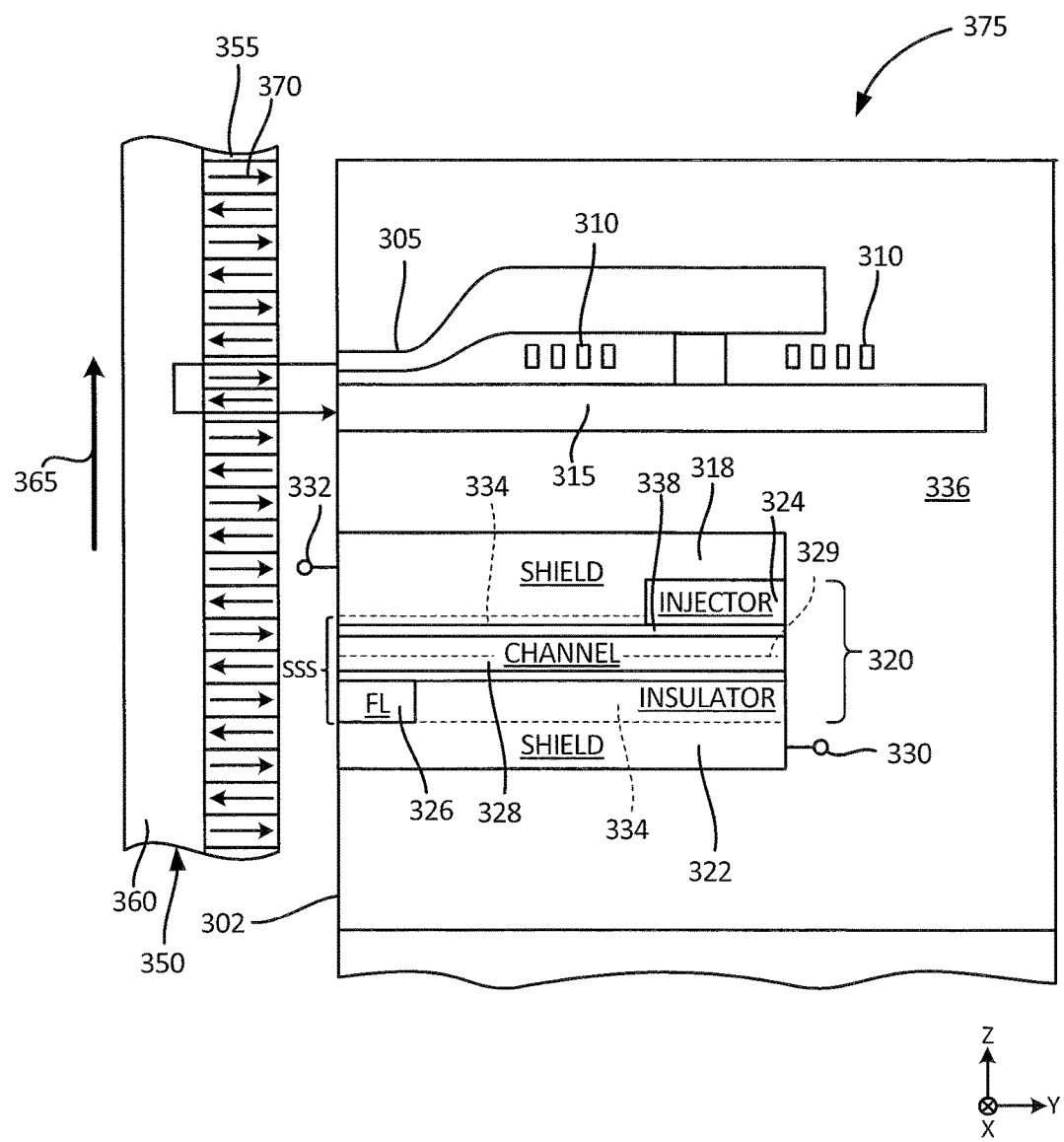
FIGS. 3B, 3C and 3D are schematic diagrams of cross-sections of other embodiments of a recording head that reads from and writes to a storage medium.
Figure 3C:
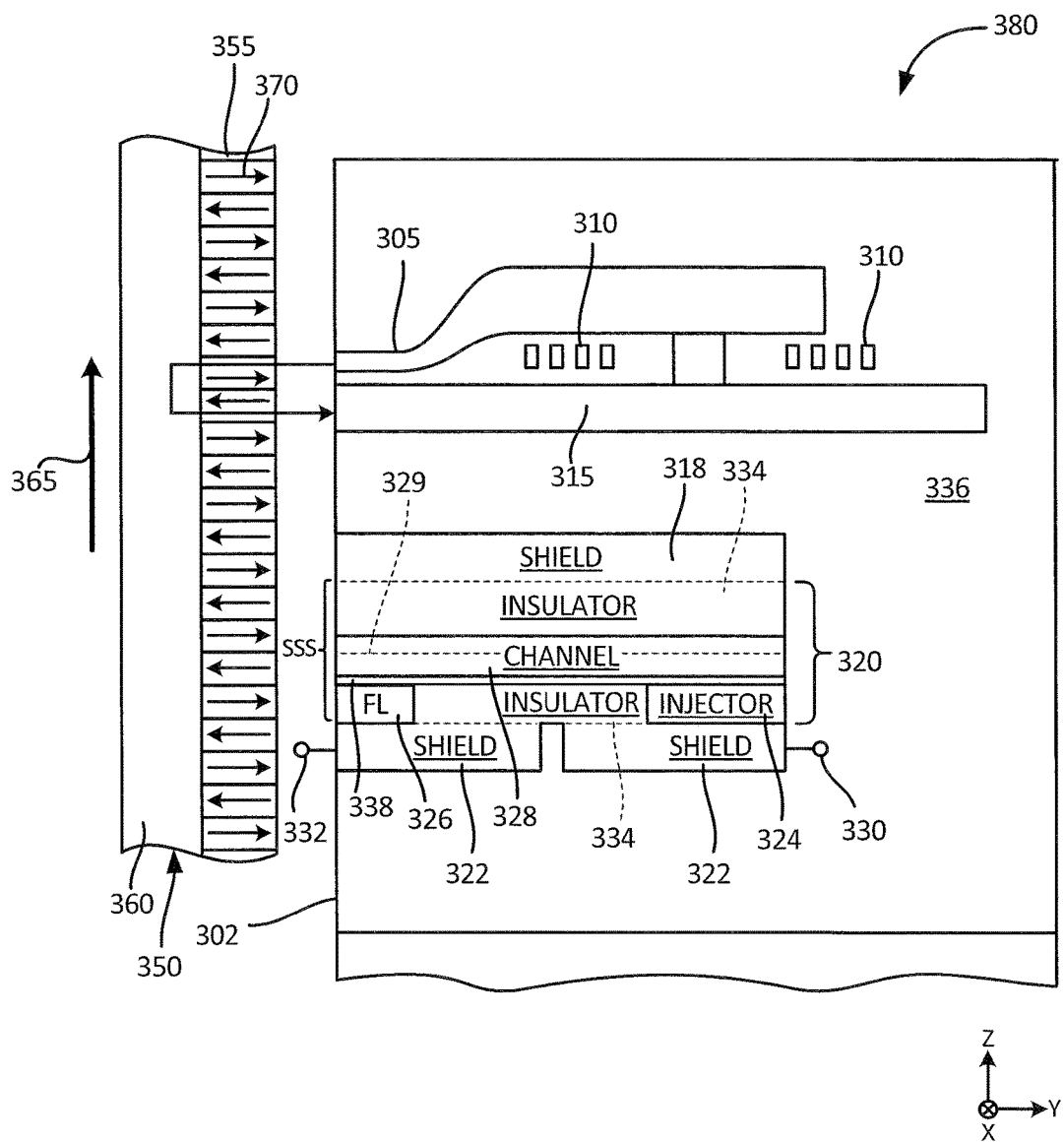
Figure 3D:
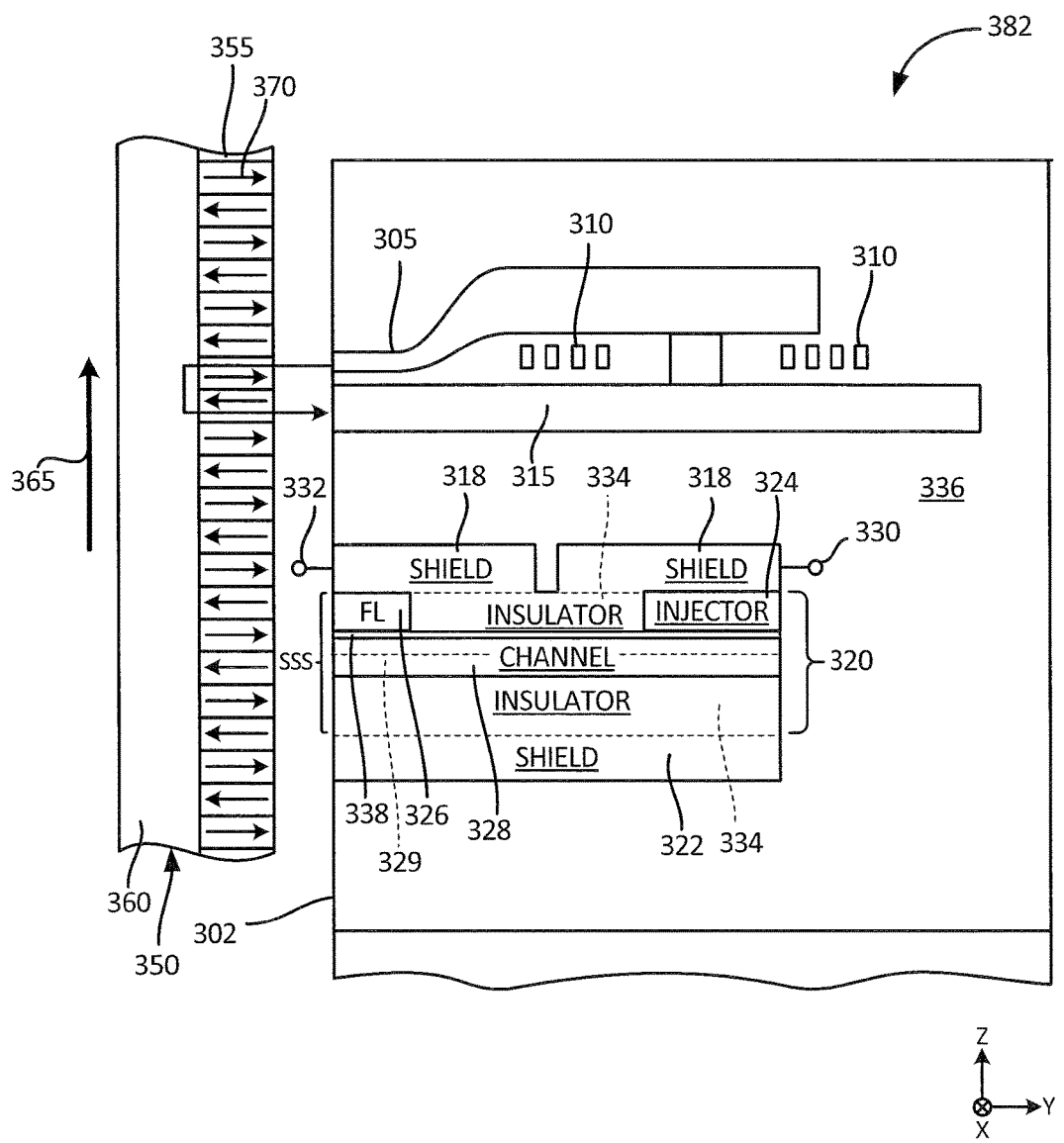

FIG. 3B shows an embodiment of a recording head 375 in which injector 324 is above channel 328 and detector 326 is below channel 328. In other respects, recording head 375 is substantially similar to recording head 300. As indicated above, in recording head 300 of FIG. 3A, insulation layer 334 between bottom shield 322 and channel 328 is substantially thinner than injector 324 to reduce SSS. Similarly, in recording head 375 of FIG. 3B, insulation layer 334 between top shield 318 and channel 328 is substantially thinner than injector 324 to reduce SSS. FIGS. 3C and 3D show other embodiments of recording heads denoted by reference numerals 380 and 382, respectively. Other than injector 324 and detector 326 being on a same side of channel 328 in recording heads 380 and 382 and bottom shield 322 or top shield 318 being separated into two electrically-isolated portions, recording heads 380 and 382 are substantially similar to recording head 300.

As noted above, to further decrease SSS, different embodiments such as 300, 375, 380 and 382 employ a spacing reduction feature 329. Reasons for including the spacing reduction feature 329 are provided below in connection 4A, 4B and 4C.

Figure 4A:
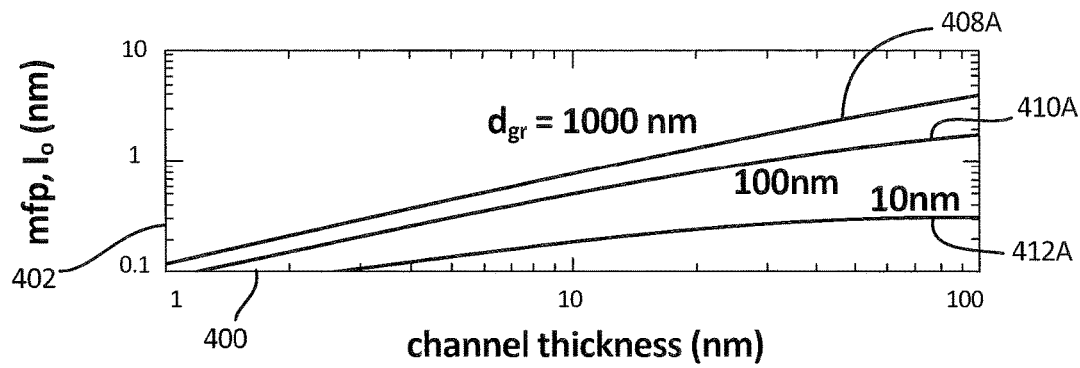
FIGS. 4A, 4B and 4C are graphs that illustrate properties of metal channels that may be employed in lateral spin valve readers.
Figure 4B:
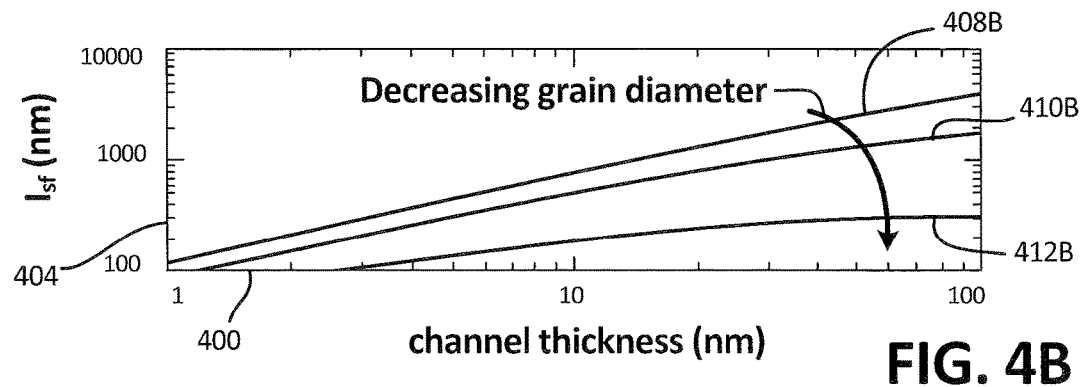
Figure 4C:
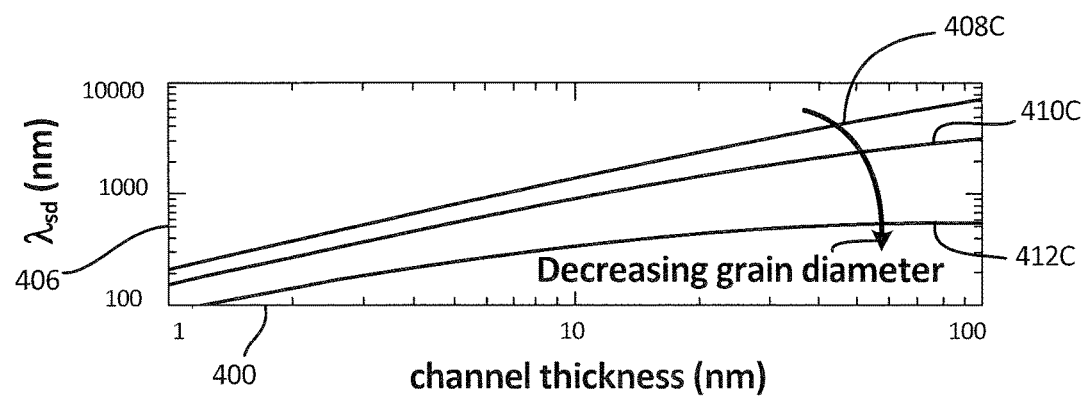

As noted earlier, the LSV-based magnetic reader has its primary advantage in reduced SSS. To date, reports on metal channel LSVs have sought to reduce channel thickness as a means to approach a smaller hypothetical SSS and have reached a minimum of about 20 nanometers (nm) in literature. This value may still be relatively large within the practical context of a magnetic reader for certain applications, and therefore further thickness reduction may be required. The challenge of reducing the LSV channel thickness is rooted in the transport mechanisms that dominate under the scaled condition that lead to an exponentially diminished signal. Specifically, surfaces, which are benign for bulk conduction in metals, become exponentially more effective at scattering electron momentum as the channel thickness is reduced. At a thickness scale of less than 20 nm, the scattering is severe enough to limit spin diffusion length to merely 10's of nanometers or less as shown in FIGS. 4A, 4B and 4C, which are plots for metal (e.g., copper (Cu)) channels with differing grain diameters ($d_{gr}$) of the metal. In each of FIGS. 4A, 4B and 4C, a horizontal axis 400 represents channel thickness in nm. In FIG. 4A, a vertical axis 402 represents a spin-dependent electron mean free path ($l_o$) in nm. In FIG. 4B, a vertical axis 404 represents spin flip length ($l_{sf}$) in nm. In FIG. 4C, a vertical axis 406 represents spin diffusion length ($\lambda_{sd}$) in nm. In FIG. 4A, plot 408A is for a metal channel in which a grain diameter of the metal is 1000 nm. Plots 410A and 412A are for metal channels with grain diameters of 100 nm and 10 nm, respectively. Similar plots for decreasing grain diameters are shown in FIGS. 4B (plots 408B, 410B and 412B) and 4C (plots 408C, 410C and 412C). From FIGS. 4A, 4B and 4C, it is seen that, in a metal such as Cu, transport characteristics are dominated by grain boundary and surface characteristics. Spin diffusion length shown in FIG. 4C follows an exponential dependence on channel thickness due to surfaces dominating at low thickness values. Therefore, at the thickness scale necessary for LSV channels in some applications, surface scattering must be suppressed by innovative engineering or novel materials with different transport properties.

In some embodiments, to address the problems described above in connection with FIGS. 4A, 4B and 4C, thickness reduction feature 329 (shown in FIG. 3A-3D) includes a two-dimensional semiconducting layer such as graphene or transition-metal dichalcogenide (TMDC) ($MoS_2$, $WS_2$, etc.). Graphene is a single atom thick carbon allotrope with hybridized sp2 bonds in a hexagonal crystal lattice. From the atomic arrangement stems the electronic band structure which is unique with its V-shaped E-k profile (relationship between energy and momentum of available quantum mechanical states for electrons) and zero energy bandgap. In short, graphene is a single atom thick semiconductor with a zero energy band gap. Due to its unique band structure that promotes low spin-orbit coupling and high electron/hole mobility, the electron and hole spin diffusion lengths are the longest of any electronic material in existence. To date, spin diffusion lengths have reached 15 µm in transferred graphene. This property combined with its inherent thickness of 3 angstroms (Å) make it an ideal candidate for a LSV channel. In this respect, graphene serves as the extreme limit for downscaled channel thickness in a LSV-based magnetic reader and consequently provides a means to increase FL thickness that will reduce magnetic noise while still maintaining a greatly reduced SSS.

As indicated above, in some embodiments, the two-dimensional semiconducting layer may comprise a TDMC monolayer, which is an atomically thin semiconductor of the type $MX_2$, where M is a transition metal atom (Mo, W, etc.) and X is a chalcogen atom (S, Se, or Te). One layer if M atoms is sandwiched between two layers of X atoms. A $MoS_2$ monolayer is about 6.5 Å thick. An embodiment of an LSV reader having a two-dimensional semiconducting layer is described below in connection with FIGS. 5A and 5B.

Figure 5A:
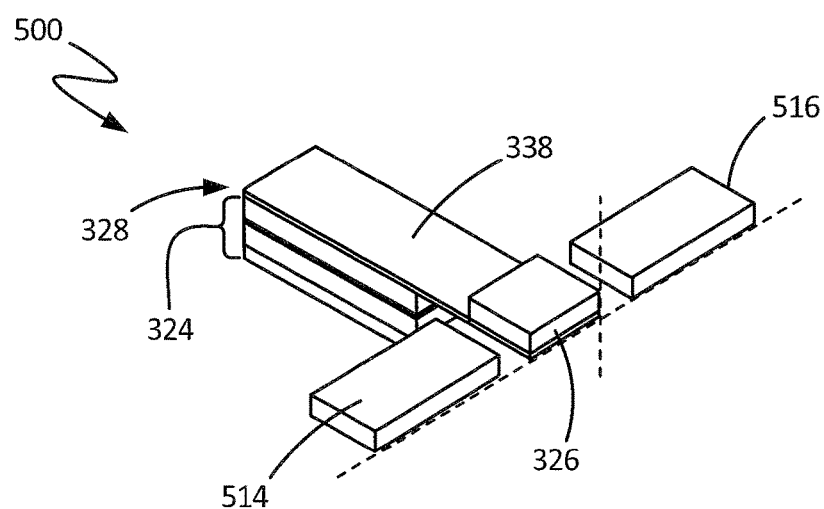
FIG. 5A is a schematic perspective view of a lateral spin valve reader in accordance with one embodiment.
Figure 5B:
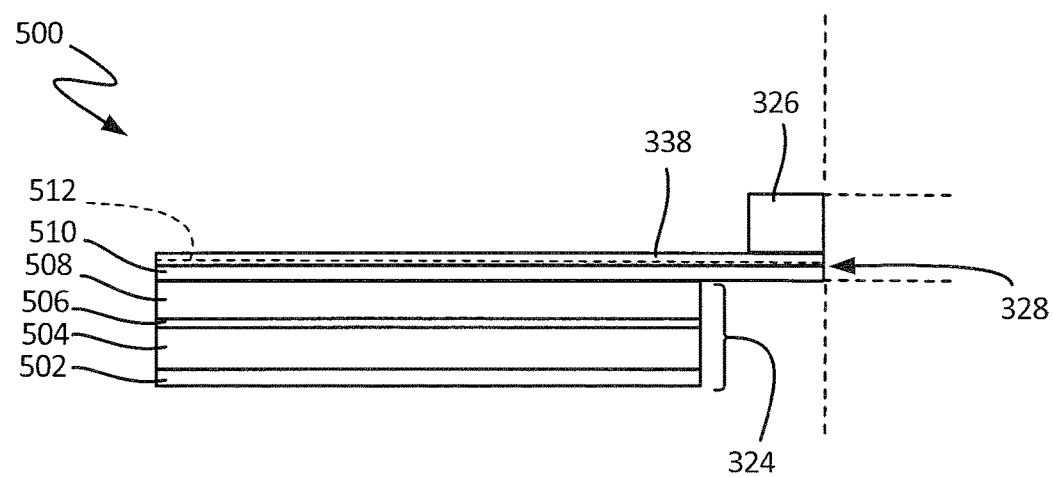
FIG. 5B is a cross-sectional view of the lateral spin valve reader of FIG. 5A.

FIG. 5A is a schematic perspective view of an LSV reader 500, which is specific embodiment of LSV reader 320 of FIG. 3A. FIG. 5B is a cross-sectional view of the LSV reader 500 of FIG. 5A. In LSV reader 500, spacing reduction feature 329 (of FIG. 3A) includes a two-dimensional semiconducting layer, which is disposed on a metal seed layer. The same reference numerals are used for elements of LSV reader 500 that are similar to the elements of LSV reader 320 of FIG. 3A. Also, a description of the same or similar elements is not repeated.

As in the case of LSV sensor 320 (of FIG. 3A), LSV sensor 500 includes injector 324, detector 326 and channel 328 that extends from injector 324 to detector 326. In the interest of simplification, top and bottom shields, etc., are not shown in FIGS. 5A and 5B. As can be seen in FIGS. 5A and 5B, injector 324 of sensor 500 includes an anti-ferromagnetic (AFM) layer 502 and a synthetic anti-ferromagnetic (SAF) structure that includes a pinned layer 504, a thin separation layer 506, which may comprise a metal such as Ruthenium (Ru) in some embodiments, and a reference layer 508. Channel 328 includes a channel seed layer 510 and a two-dimensional semiconducting layer 512, which is an example of a spacing reduction feature 329 (of FIG. 3A). Channel seed layer 510 is an ultra-thin metal layer (e.g., a Cu layer, an Ag layer or any other layer that helps nucleate growth of graphene or any other material of the two-dimensional semiconducting layer 512). A Cu seed layer 510, for example, may serve as a non-magnetic parallel conduction channel. Tunnel barrier layer 338 is disposed over the two-dimensional semiconducting layer 512. As indicated earlier, detector 326, which is positioned over the tunnel barrier layer 338, may include a magnetic, electrically conductive layer (e.g., a CoFeB layer) having a magnetization that is free to move in response to a magnetic field. Side shields 514 and 516 are included for magnetostatic biasing of the FL of detector 326. The SSS of this design shown in FIGS. 5A and 5B is feasible down to about 10 nm. Alternatively, the design of FIGS. 5A and 5B allows for a greater FL volume while simultaneously reducing SSS compared to standard CPP-MTJ type readers as well as certain LSV-based readers. As indicated above, an increase in FL volume or thickness results in a reduction of magnetic noise in the reader.

Figure 6:
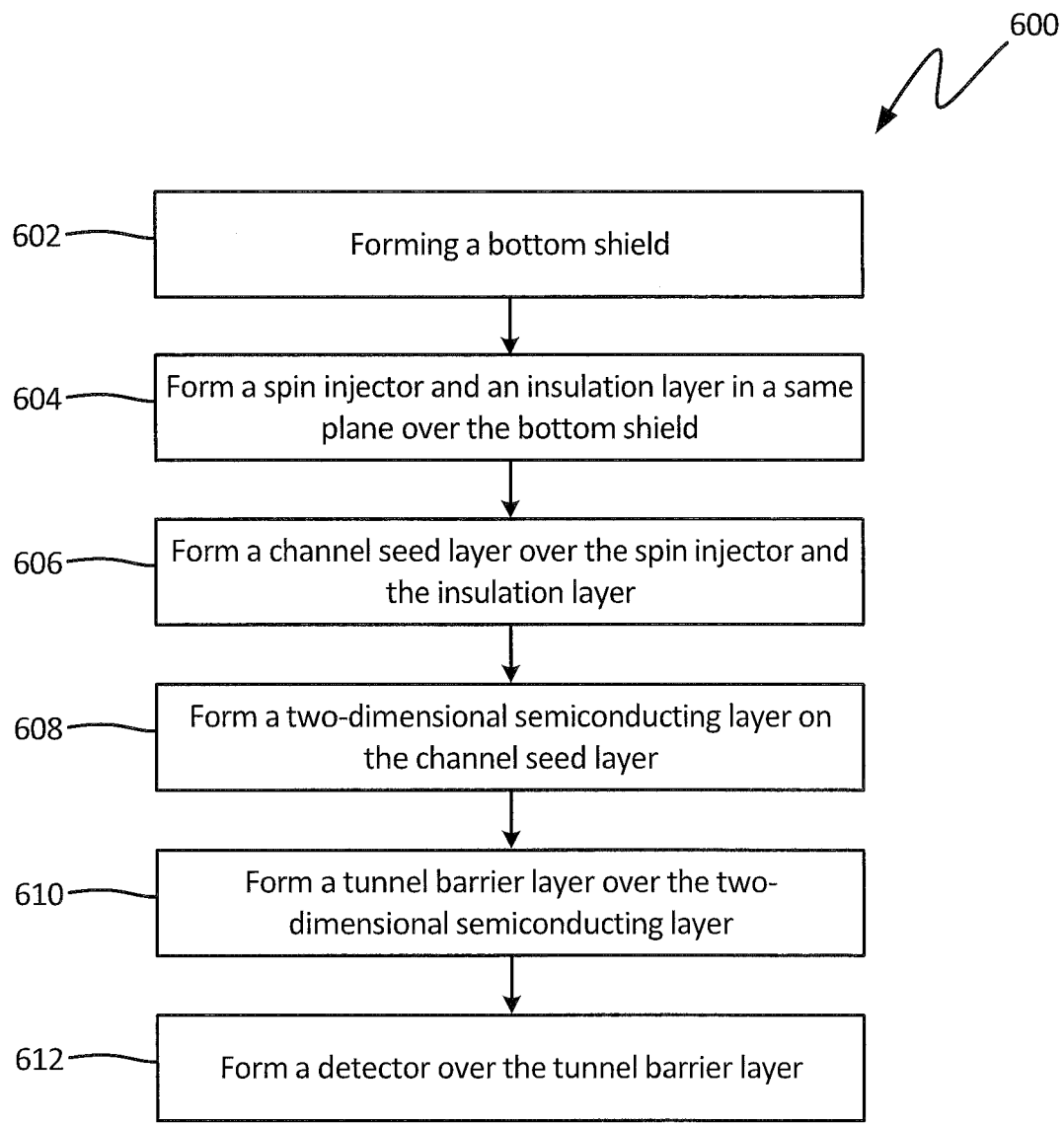
FIG. 6 is a simplified flow diagram of a method embodiment.

FIG. 6 is a simplified flow diagram 600 of a method of forming a LSV reader in accordance with one embodiment. The method includes forming a bottom shield at step 602. At step 604, a spin injector and an insulation layer are formed in a same plane over the bottom shield. The method further includes forming a channel seed layer over the spin injector and the insulation layer at step 606. At step 608, a two-dimensional semiconducting layer is formed on the channel seed layer. At step 610, a tunnel barrier layer is formed over the two-dimensional semiconducting layer. At step 612, a detector is formed over the tunnel barrier layer. It should be noted that steps 602-612 describe the formation of an LSV reader of the type shown in FIG. 3A. However, different relatively minor alterations may be made to an order in which some of steps 602-612 are carried out to provide the different LSV sensor embodiments shown in FIGS. 3B, 3C and 3D. A method of fabricating an LSV sensor that includes a graphene layer as the two-dimensional semiconducting layer is described below in connection with FIG. 7A through 7HH.

Figure 7A:
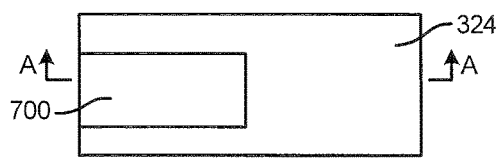
FIGS. 7A-7HH are schematic diagrams of reader layers that collectively illustrate formation of a lateral spin valve reader in accordance with one embodiment.
Figure 7A:
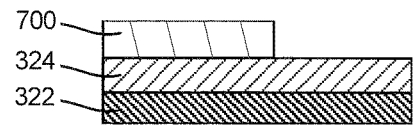
Figure 7B:
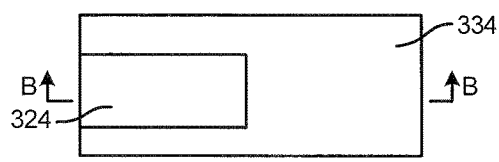
Figure 7B:
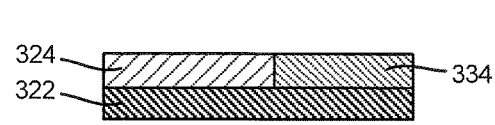
Figure 7C:
Figure 7C:
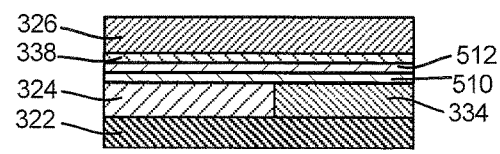
Figure 7D:
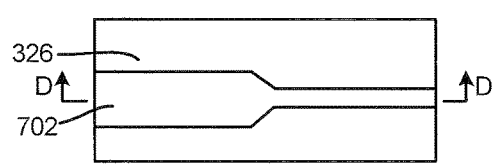
Figure 7D:
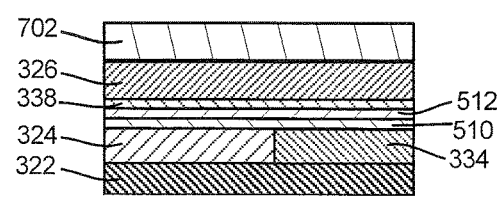
Figure 7E:
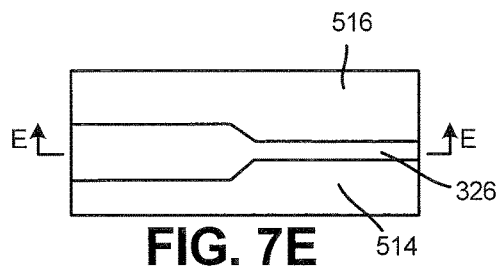
Figure 7E:
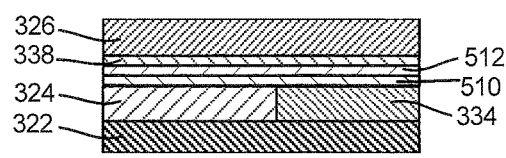
Figure 7F:
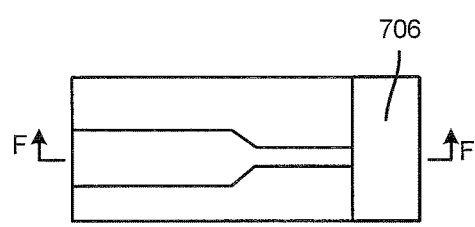
Figure 7F:
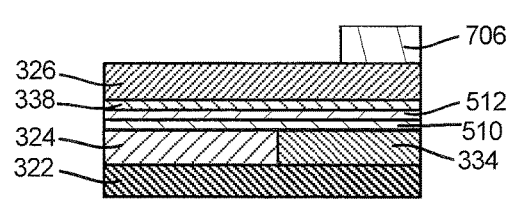
Figure 7G:
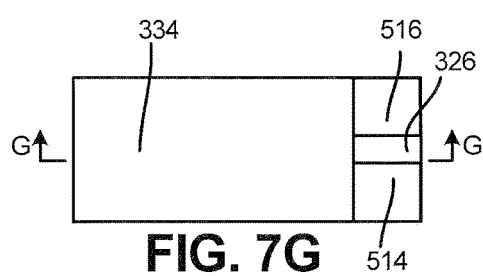
Figure 7G:
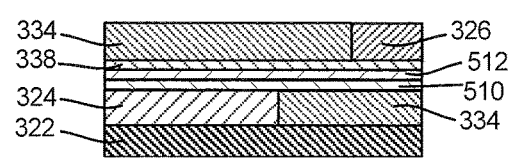
Figure 7H:
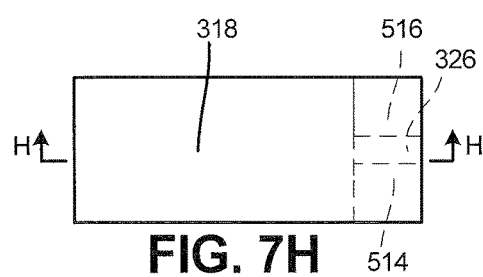
Figure 7H:
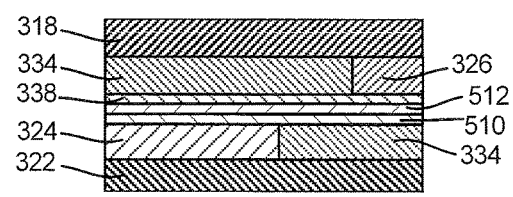

FIGS. 7A-7HH are schematic diagrams of top down views and cross sectional views, respectively, of portions of an LSV reader such as 400 during different intermediate stages of formation of the reader in accordance with one embodiment. Sequential deposition of the bottom shield 322 and layers of injector 324 initiate the process of formation of the LSV reader. Those elements are shown in FIGS. 7A and 7AA. In the interest of simplification, a substrate on which the bottom shield 322 is deposited is not shown, and individual layers of the SAF structure that constitute the injector 324 are not separately shown in FIGS. 7A and 7AA. Deposition of the bottom shield 322 and the injector 324 is followed by photolithographic patterning of the injector 324, which involves the use of a resist mask or a hard mask 700 shown in FIGS. 7A and 7AA. A portion of the injector 324 that is not covered by mask 700 is etched away by, for example, an ion milling or a reactive ion etching process. The removed area is then backfilled with an insulating dielectric (e.g., $Al_2O_3$) 334 to provide an electrically insulating layer as shown in FIG. 7B. The structure is also planarized as shown in FIG. 7BB. Following the planarization step, a thin film (e.g., less than 5 nm) 510 of Cu or Ag is blanket deposited across the wafer surface and serves two purposes, 1) a seed layer for subsequent graphene growth by chemical vapor deposition (CVD) and 2) as a non-magnetic parallel spin-conduction channel. Graphene has the ability to grow by a self-limiting process on Cu or Ag films. Therefore, the next step is CVD growth of graphene 512 on the surface of the Cu or Ag seed layer 510. It should be noted that CVD of graphene 512 is carried out at a relatively low temperature that is compatible with maximum process temperature constraints imposed by layers that are incorporated in the SAF injector 324. Following the growth of graphene 512, a thin dielectric layer is blanket-deposited across the wafer. The thin dielectric layer will serve as tunnel barrier layer 338. One example of a dielectric material for the tunnel barrier layer 338 is MgO. However, in different embodiments, dielectrics such as $Al_2O_3$, $TiO_2$, SiN, AN, and others may also be employed for the tunnel barrier layer 338. Following the dielectric deposition for the tunnel barrier layer 338, one or more layers that will form the detector 326 are deposited across the wafer. The different layers for the channel 328, the tunnel barrier 338 and the detector 326 are shown in FIGS. 7C and 7CC. As shown in FIGS. 7D and 7DD, channel 328 is then patterned with a resist mask or a hard mask 702. This is followed by ion milling or reactive ion etching away layers of the detector 326, the tunnel barrier 338, graphene 512, and the Cu or Ag seed layer 510. The removed area is then backfilled with an insulating dielectric (e.g., $Al_2O_3$) and side shields 514 and 516 to provide the structure shown in FIGS. 7E and 7EE. As shown in FIGS. 7F and 7FF, the detector 326 is patterned with a resist or hard mask 706. Portions of the detector 326 and side shields 514 and 516 that are not covered by mask 706 are etched away by, for example, an ion milling or a reactive ion etching process. The removed area is then backfilled with insulating dielectric (e.g., $Al_2O_3$) 334 to provide an electrically insulating layer as shown in FIG. 7G. The structure is also planarized as shown in FIG. 7GG. The planarization may be carried out by, for example, a chemical mechanical polishing etch. This is followed by deposition of top shield 318 as shown in FIGS. 7H and 7HH.

The choice of seed layer for graphene is of importance in terms of spin transport in the conglomerate metal/graphene channel. It is noted that spin transport will take place in both the metal seed layer as well as the graphene layer since the metal layer will remain. Since both serve as non-magnetic channels, parallel conduction will take place. However, since graphene's spin-flip scattering rate and spin diffusion length are vastly longer than any metal, especially at the metal channel thickness being considered, the majority of spin transport is expected to be in the graphene film. As noted above, a Cu film is suitable for graphene growth since the growth process self-limits to a single layer of carbon coalescing into a hexagonal crystal lattice. Further, graphene crystal grains are not dictated by the polycrystalline Cu grains and therefore high-quality graphene growth is feasible regardless of Cu grain size. Finally, as stated above, Ag is another option for a seed for graphene growth. Graphene growth on Ag, although self-limiting, is not limited to a single monolayer of carbon and two-layer graphene is possible. The potential advantage to having a bilayer of graphene is a reduced interaction (e.g., surface phonon coupling) between the electrons in the graphene layer and the Ag channel. The metal seed may be necessary for graphene growth, in some embodiments, but if all transport were restricted solely to the graphene channel, the LSV reader would benefit from the better spin transport properties of graphene. Therefore, an Ag seed and bilayer graphene growth may pose as an enhanced alternative to Cu seeds without adding process complexity.

Graphene as a spin-conduction channel has other attributes that benefit it as an LSV reader in addition to its thinness. As previously stated, graphene is a crystalline semiconductor with zero energy band gap. Therefore, it supports both electron and/or hole population and transport. An inherent quality of semiconductors is that their carrier (electrons or holes) populations can be modulated by intrinsic (doping, built-in electric fields, etc.) and extrinsic (electrostatic gating) methods. The populations are modulated by means of adjusting a Fermi level in the graphene. Substitutional doping graphene with B or N atoms allows a tuning knob to achieve hole acceptor or electron donor dominance in the graphene sheet. This can lead to enhancement of charge density and thus spin-density in the case of a spintronic device such as a LSV sensor. The same result can be achieved by a different means through electric field tuning via an electrostatic gate electrode. By imposing an external electric field on the graphene sheet the Fermi level is shifted according to the polarity of the field and promotes an increase (or decrease if desired) of carrier density in the portion of the graphene sheet under influence of the field. This is a method by which the user may externally change the charge population and therefore the spin population of the LSV channel. Moreover, it serves as an additional knob for tuning the magnetic response since modulating the charge (and therefore spin) population enhances the selectivity of the magnetic response. Electrostatic gating can be achieved if one or both of the shields are used simultaneously as gate electrodes. This provides further novelty in the graphene-channel LSV design for a magnetic reader since the gate electrode provides additional tuning for spin signal enhancement and in-situ, user defined device resistance.

In the embodiment described above in connection with FIGS. 7A-7HH, graphene 512 is deposited on seed layer 510 that is a part of the LSV reader. However, as shown in FIGS. 8A and 8B, in some embodiments, graphene layer 512 is formed on a separate/external substrate 800 by a CVD process that is separate from deposition of any layers of the LSV sensor. The externally formed graphene layer 512 is then removed from the separate/external substrate 800 and transferred onto the LSV reader portion shown in FIG. 8B, which includes coplanar injector 324 and insulator 334 on bottom shield 322. Such a technique that involves forming the graphene layer on an external substrate and then transferring the graphene layer to the target substrate is referred to herein as a "transfer process." As shown in FIG. 8B, an upper surface 802 of the injector 324 and the insulator 344, which receives the externally formed graphene layer 512, may be perforated prior to the transfer of the externally formed graphene layer 512. The perforations are denoted by reference numeral 804 in FIG. 8B. After transfer of the graphene layer 512 onto the upper surface 802, the remaining steps for forming the LSV reader are similar to those described above in connection with FIGS. 7C-7HH. It should be noted that, in the embodiment of FIGS. 8A and 8B, the perforations 804 serve as regions where graphene 512 is suspended in air. This suspension of graphene 512 introduces regions in the graphene layer 512 where the electrons or holes are decoupled from their interactions with the substrate, thereby allowing the carriers to travel in the graphene lattice 512 nearly unimpeded by scattering centers. Utilization of this method for transport enhancement results in commensurate improvements in the spin accumulation and the spin signal.

In yet another embodiment, which is similar to the embodiments described above in connection with FIGS. 7A-7HH, a graphene layer/film 512 is cut into ribbons on a scale of a few nanometers up to a few 10's of nanometers. In such an embodiment, after deposition of the graphene layer 512 on the seed layer 510, designated regions of the graphene layer are etched away to form ribbons 900 shown in FIG. 9. The remaining deposition steps are then carried out in a manner described above in connection with FIGS. 7C-7HH. When ribbons 900 are formed, the atomic symmetry is broken due to the introduction of hard-wall boundaries (graphene edges) and an energy band gap opens up. The occurrence of a band gap provides the opportunity for electronic switching by adjusting a Fermi level in the graphene 512 between the conduction band (electron population, on-state), the band gap (no population, off-state of the device), and the valence band (hole population, on-state with reverse polarity). Additionally, with the opening of a band gap, singularities form in the electronic density of states (Van Hove singularities) that cause discontinuities in the charge versus voltage profile (and capacitance-voltage profile). The opening of a band gap in the graphene channel 512 of an LSV is beneficial since it can be leveraged to enhance the on-off ratio of the magnetoresistance. Moreover, with an electrostatic gate the charge polarity can be abruptly switched with the attribute of a conduction channel with a band gap. The Van Hove singularities are a consequence of the band gap formation but can be used to detect that a graphene ribbon is used within the LSV channel through electrical probing by capacitance-voltage sweeps.

Figure 10A:
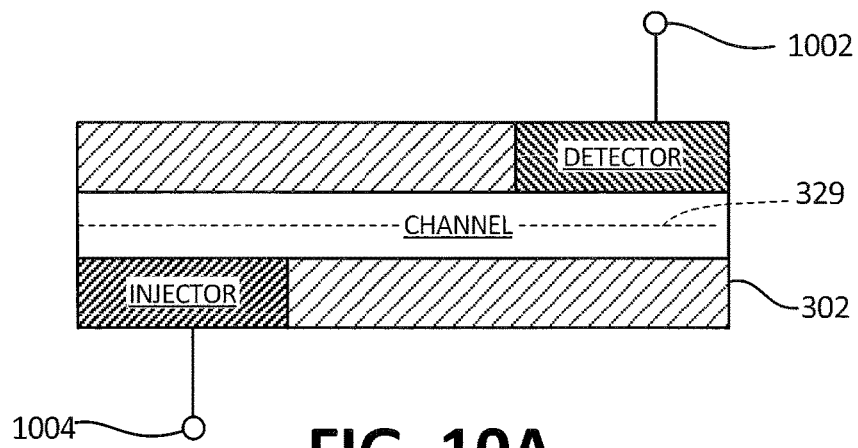
FIGS. 10A, 10B and 10C are schematic diagrams of cross-sections of lateral spin valve readers with different lead terminal configurations.
Figure 10B:
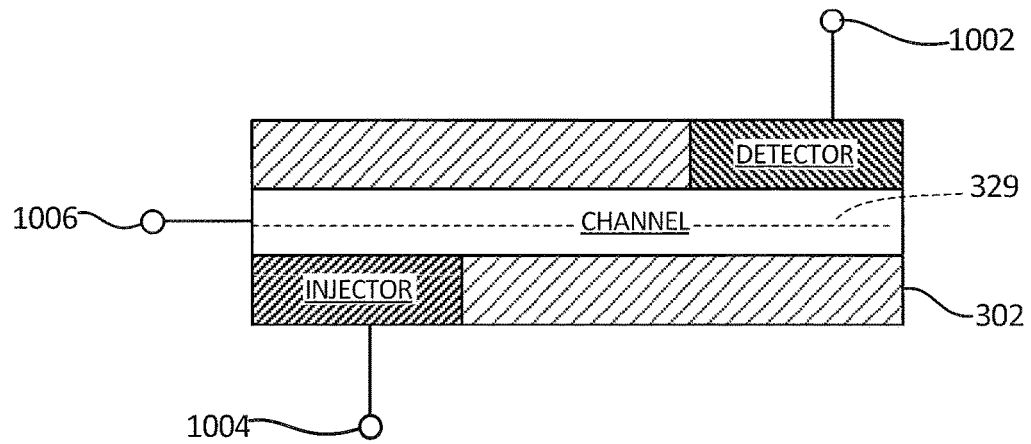
Figure 10C:
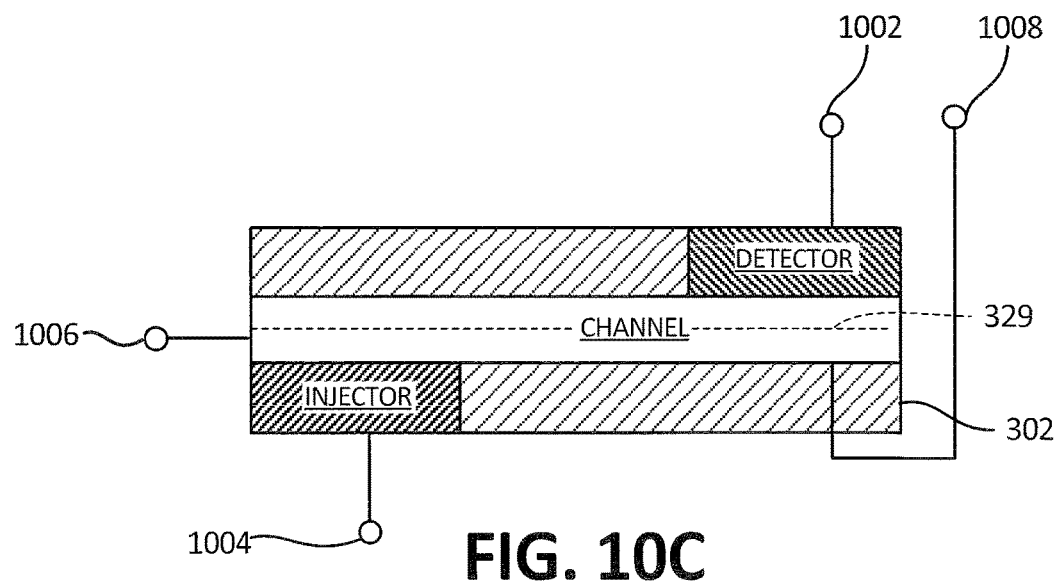

In the above-described LSV reader embodiments, electrical contacts are not shown. However, it is noted that two, three, four, or any other number of contacts may be implemented in various embodiments of the LSV reader. The contact configuration utilized depends on a type of detection scheme and application. FIG. 10A shows an example of an LSV reader such as 320 that has a two-terminal/two-contact (1002 and 1004) configuration. FIG. 10B shows an example of an LSV reader 320 that has a three-terminal/three-contact (1002, 1004 and 1006) configuration, and FIG. 10C shows an example a four-terminal/four-contact (1002, 1004, 1006 and 1008) configuration.

Figure 11A:
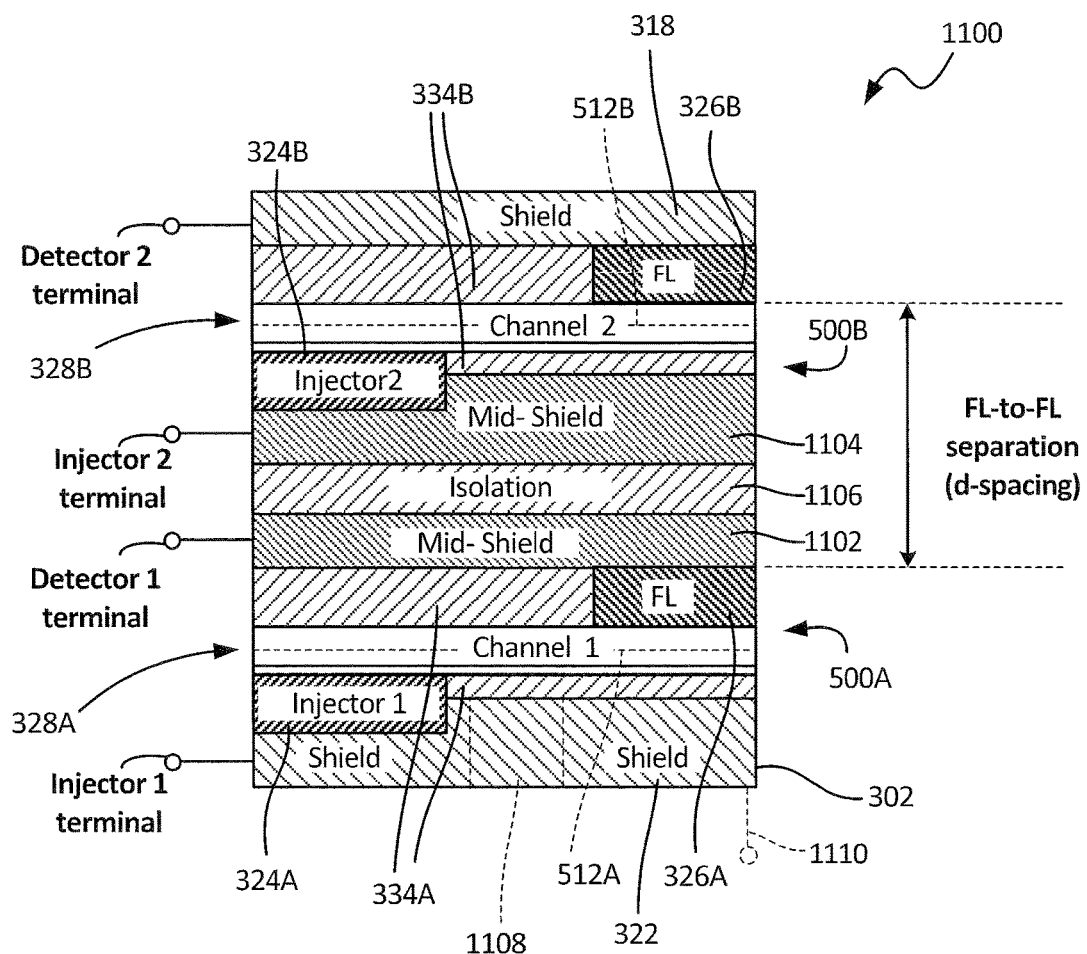
FIGS. 11A and 11B are diagrammatic illustrations of cross-sections of multi-sensor readers in accordance with different embodiments.
Figure 11B:
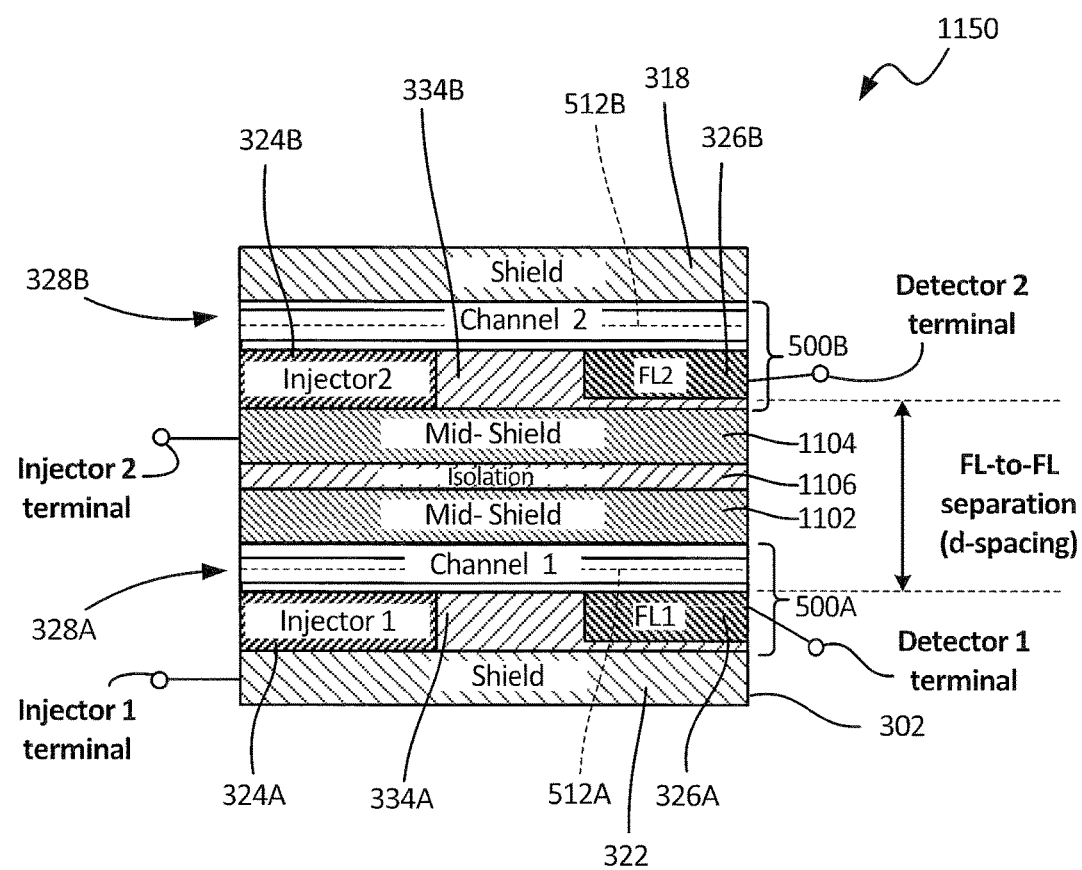

As indicated earlier in connection with the description of FIGS. 5A and 5B, for example, an LSV reader such as 500 has an extremely narrow SSS proximate to a bearing surface such as 302. Therefore, it is a very suitable reader design to implement in a multi-sensor configuration where two or more readers are stacked on top of each other within a single recording head. One example of a dual-reader configuration is shown in FIG. 11A. The embodiment of reader 1100 in FIG. 11A includes a top shield 318, a bottom shield 322 and LSV sensors 500A and 500B interposed between top shield 318 and bottom shield 322. Sensor 500A includes an injector 324A, a detector 326A and a channel 328A that includes a two-dimensional semiconducting layer 512A. Similarly, sensor 500B includes an injector 324B, a detector 326B and a channel 328B that includes a two-dimensional semiconducting layer 512B. In sensors 500A and 500B, injectors 324A and 324B are positioned below channel layers 328A and 328B, respectively. Detectors 326A and 326B are positioned above channel layers 328A and 328B, respectively. Isolation layers in sensors 500A are 500B are denoted by 334A and 334B, respectively. In the embodiment shown in FIG. 11A, a two-terminal connection configuration is used for each shield. Accordingly, bottom shield 322 and a middle shield 1102 are utilized for electrical connection to sensor 500A. Similarly, a middle shield 1104 and top shield 318 are utilized for electrical connection to reader 500B. A suitable isolation layer 1106 is interposed between middle shields 1102 and 1104 to provide the necessary electrical isolation between the shields. In the embodiment of FIG. 11A, isolation layer 334B on middle shield 1104 is substantially thinner than injector 324B. Isolation layer 334A on bottom shield 322 may optionally be substantially thinner than injector 324A. In some embodiments, isolation layer 334A on bottom shield 322 may be substantially of a same thickness as injector 324A. FIG. 11B shows an embodiment of a reader 1150, which includes elements that are substantially similar to the elements of reader 1100. However, in reader 1150, injector 324A and detector 326A are positioned below channel 328A, and injector 324B and detector 326B are positioned below channel 328B. A comparison of FIGS. 11A and 11B, shows that the d-spacing in the embodiment of FIG. 11B is further reduced (from the embodiment of FIG. 11A) by a thickness of 2 FL. It should be noted that FIGS. 11A and 11B are illustrative embodiments of a multi-sensor readers and, in other embodiments, readers with more than two LSV sensors may be employed.

As noted earlier, electrostatic gating can be achieved in LSV sensors if one or more of the shields are used simultaneously as gate electrodes. For example, in reader 1100 of FIG. 11A, bottom shield 222 may divided into two electrically isolated portions by eliminating shield material from region 1108. An additional electrical contact 1110 may then be provided to serve as a gate connection.

Although various uses of the LSV reader with the two-dimensional semiconducting channel layer are disclosed in the application, embodiments are not limited to the particular applications or uses disclosed in the application. It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the LSV reader with the two-dimensional semiconducting channel layer while maintaining substantially the same functionality without departing from the scope and spirit of the present disclosure. In addition, although the preferred embodiment described herein is directed to particular type of LSV reader with the two-dimensional semiconducting channel layer utilized in a particular data storage system, it will be appreciated by those skilled in the art that the teachings of the present disclosure can be applied to other data storage devices without departing from the scope and spirit of the present disclosure.

What is claimed is:

1. A lateral spin valve reader comprising:
   a detector that forms a portion of a bearing surface;
   a spin injector spaced apart from the bearing surface and the detector;
   a channel extending from the bearing surface and the detector to the spin injector, wherein the channel comprises:
      a metal seed layer that extends from the bearing surface and the detector located adjacent to the bearing surface to the spin injector;
      a two-dimensional semiconducting layer deposited on the metal seed layer and extends from the detector to the spin injector; and
      a dielectric tunnel barrier layer deposited over the two-dimensional semiconducting layer and located at least between the two dimensional semiconducting layer and the detector and extends from the bearing surface and the detector to the spin injector.

2. The lateral spin valve reader of claim 1 and wherein the two-dimensional semiconducting layer comprises a graphene monolayer or a transition metal dichalcogenide (TMDC) monolayer.

3. The lateral spin valve reader of claim 1 and wherein the metal seed layer comprises silver or copper.

4. The lateral spin valve reader of claim 1 and wherein the two-dimensional semiconducting layer is divided into a plurality of ribbons.

5. The lateral spin valve reader of claim 1 and further comprising a two-terminal configuration, a three-terminal configuration or a four-terminal configuration.

6. The lateral spin valve reader of claim 1 and wherein the detector, the spin injector, the channel and the dielectric tunnel barrier layer are positioned between a top shield and a bottom shield, wherein at least one of the top shield or the bottom shield comprises an external voltage bias electrode configured to control electrical properties of the two-dimensional semiconducting channel layer.

7. A recording head comprising:
   a top shield;
   a bottom shield; and
   at least one lateral spin valve reader interposed between the top shield and the bottom shield, wherein the at least one lateral spin valve reader comprises:
      a detector that forms a portion of a bearing surface;
      a spin injector spaced apart from the bearing surface and the detector;
      a channel extending from the bearing surface and the detector to the spin injector, wherein the channel comprises:
         a metal seed layer that extends from the bearing surface and the detector located adjacent to the bearing surface to the spin injector;
         a two-dimensional semiconducting layer deposited on the metal seed layer and extends from the detector to the spin injector; and
         a dielectric tunnel barrier layer deposited over the two-dimensional semiconducting layer and located at least between the two dimensional semiconducting layer and the detector and extends from the bearing surface and the detector to the spin injector.

8. The recording head of claim 7 and wherein the two-dimensional semiconducting layer comprise a graphene monolayer or a transition metal dichalcogenide (TMDC) monolayer.

9. The recording head of claim 7 and wherein the metal seed layer comprises silver or copper.

10. The recording head of claim 7 and wherein the two-dimensional semiconducting layer is divided into a plurality of ribbons.

11. The recording head of claim 7 and wherein the at least one lateral spin valve reader comprises a plurality of lateral spin valve readers are interposed between the top shield and the bottom shield.

12. A lateral spin valve reader comprising:
   a detector located adjacent to a bearing surface;
   a spin injector spaced apart from the bearing surface and the detector;
   a channel extending from the bearing surface and the detector to the spin injector, wherein the channel comprises a two-dimensional semiconducting layer that extends from the detector to the spin injector;
   a dielectric tunnel barrier layer deposited over the two-dimensional semiconducting layer and located between the two dimensional semiconducting layer and the detector; and
   an insulation layer that is substantially coplanar with the spin injector, wherein a surface of the insulation layer comprises perforations, and wherein at least a portion of the two-dimensional semiconducting layer is disposed on the surface of the insulation layer with the perforations.

13. The lateral spin valve reader of claim 12 and wherein the two-dimensional semiconducting layer comprises a graphene monolayer or a transition metal dichalcogenide (TMDC) monolayer.

14. The lateral spin valve reader of claim 12 and wherein a surface of the spin injector comprises perforations, and wherein at least a portion of the two-dimensional semiconducting layer is disposed on the surface of the spin injector with the perforations.

15. The lateral spin valve reader of claim 12, wherein the dielectric tunnel barrier layer extends from the bearing surface and the detector to the spin injector.